E. G. SCHREIBER.
VEHICLE TRUCK.
APPLICATION FILED NOV. 1, 1911.
1,040,435.
Patented Oct. 8, 1912.
2 SHEETS—SHEET 2.
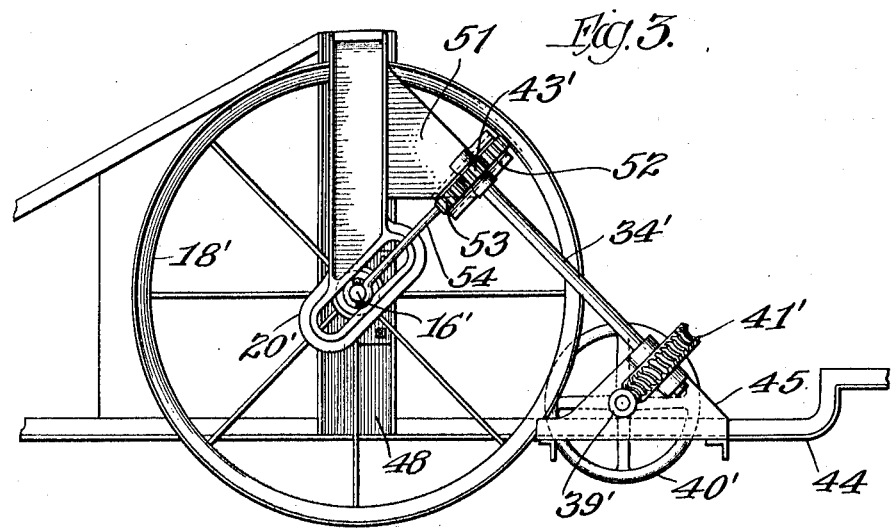
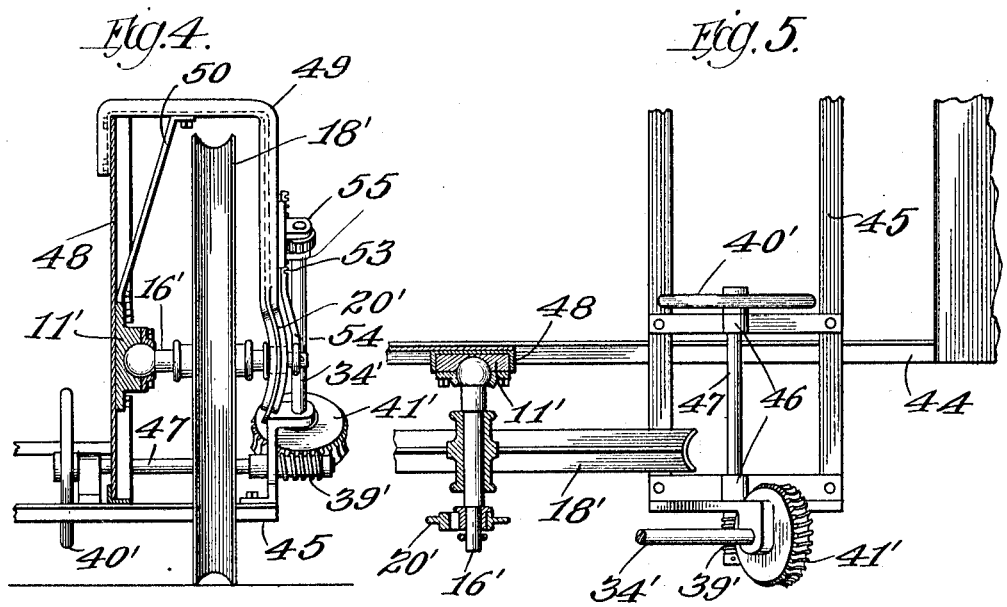
Witnesses:
E. G. Schreiber,
Inventor.

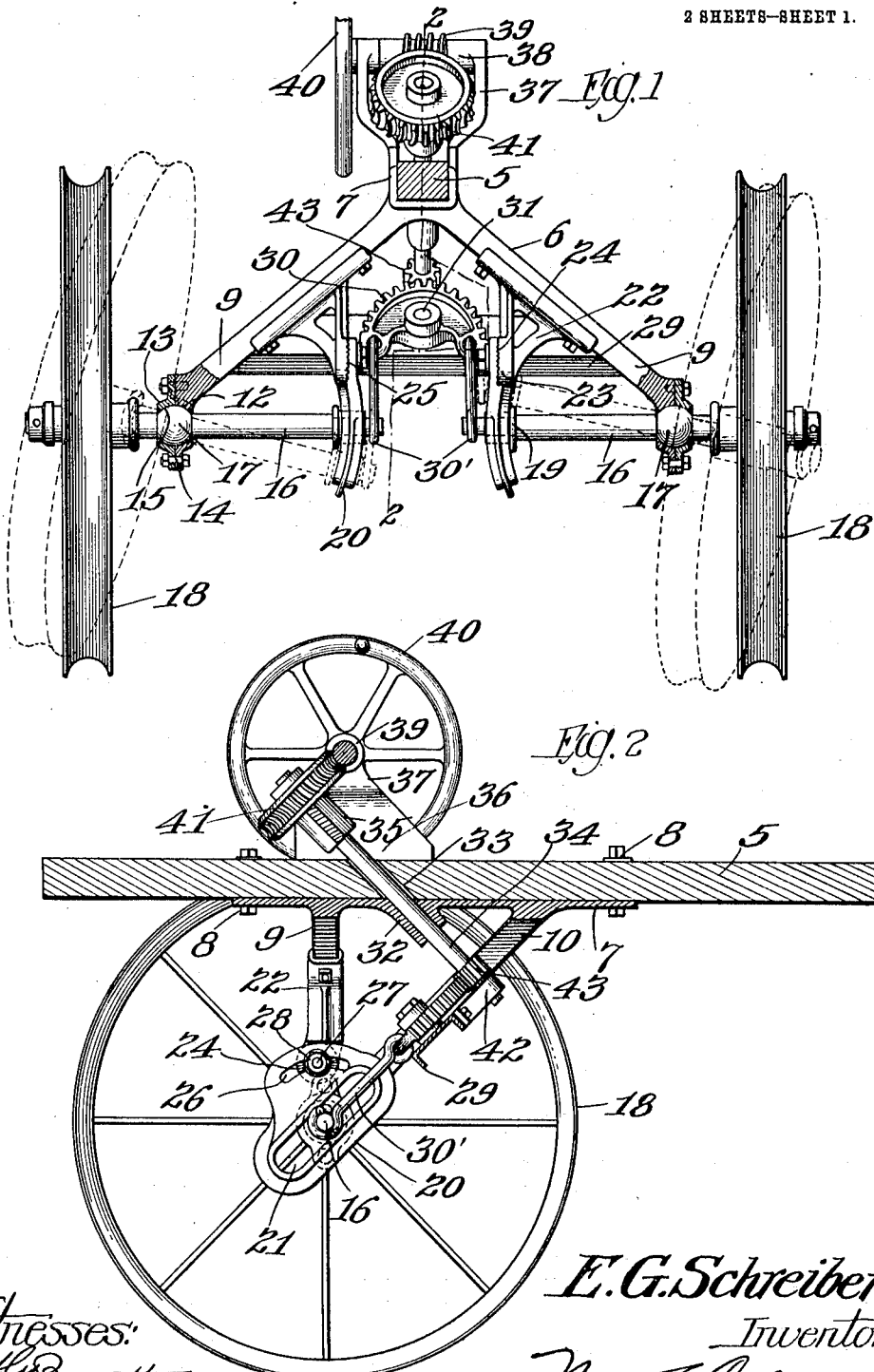

UNITED STATES PATENT OFFICE.

ERNST G. SCHREIBER, OF HAMMOND, INDIANA.

VEHICLE-TRUCK.

1,040,435.

Specification of Letters Patent.

Patented Oct. 8, 1912.

Application filed November 1, 1911. Serial No. 657,963.

*To all whom it may concern:*

Be it known that I, ERNST G. SCHREIBER, a citizen of the United States, residing at Hammond, in the county of Lake and State of Indiana, have invented certain new and useful Improvements in Vehicle-Trucks, of which the following is a specification, reference being had to the accompanying drawings.

This invention relates to supporting trucks for vehicles and more particularly to a truck embodying angularly adjustable wheels which is particularly designed for use upon hillside plows and other agricultural machines.

The invention has for its primary object the provision of simple, durable and efficient means for simultaneously adjusting the truck wheels and positioning the same with relation to the longitudinal axis of the machine, at the same angle, whereby a close or short turn of plow or other earth working machine may be made when the end of the furrow is reached.

Another object of the invention is to provide improved means for angularly adjusting the truck wheels of road graders, plows and similar machines whereby the width of the furrow cut by the plow blades may be varied, and to prevent side draft or transverse bodily movement of the machine which is induced by the plows or other earth moving elements.

Another object resides in the provision of a pair of truck wheels having stub axles fulcrumed intermediate of their ends for universal movement, and manually operable means connected to the inner ends of said axles to simultaneously position the same in parallel angular planes on opposite sides of the machine with relation to the longitudinal axis thereof.

Still another object of my invention is to provide a device of the above character which consists of comparatively few elements which are of simple form and may therefore be produced at small cost and which requires but a minimum expenditure of manual energy in its operation.

With the above and other objects in view, the invention consists of the novel features of construction, combination and arrangement of parts hereinafter fully described and claimed, and illustrated in the accompanying drawings, in which—

Figure 1 is a side elevation of my improved supporting truck showing the same arranged beneath a plow beam; Fig. 2 is a longitudinal section taken on the line 2—2 of Fig. 1; Fig. 3 is a side elevation illustrating a slightly modified form of the invention; Fig. 4 is an end view partly in section; and Fig. 5 is a top plan view with certain of the parts removed and the bearings or supports for the wheel axle shown in section.

In the accompanying drawings I have illustrated two of the many forms of agricultural machines to which my invention is applicable but it will be understood that the following description of the arrangement of the various elements is in no wise restricted to the particular applications thereof as shown in the drawings but that the principle involved may be utilized with only slight rearrangements of the parts such as the exigencies of the particular case may require.

In the embodiment illustrated in Figs. 1 and 2, 5 designates the beam of a plow to which is secured the depending truck frame 6, said frame including the longitudinally disposed channel bar 7 which embraces the plow beam and is secured thereto by means of the attaching bolts 8. The transversely extending diverging depending arms 9 are integrally formed upon the channel bar 7 adjacent one of its ends and are braced by means of the inclined bars 10 which are integrally formed with the lower ends of the arms 9 and with the channel bar 7 adjacent to its other end. The lower ends of the downwardly inclined arms 9 are vertically disposed and provided with half bearings having concave seats 12 formed in their outer faces. The cap plate or removable half of the bearing indicated at 13 is secured to the arm by means of the bolts 14 and is provided with the concave bearing seat 15 which co-acts with the bearing face 12 upon the end of the arm to movably support the wheel axle 16. This axle is provided with a spherical bearing portion 17 intermediate of its ends which is fulcrumed upon the lower ends of the supporting arms 9 in the manner above described. Upon the outer ends of the stub axles 16 the truck wheels 18 are secured in any approved manner and upon the inner ends of said axles the anti-friction rollers 19 are arranged for movement in the slots 21 of the guide plates 20. As will be noted from reference to Fig. 1 these guide plates are concavo-convex in form and are curved in concentric relation to the axle bearing 17. These plates are adjustably supported upon the brackets 22 which are rigidly fixed to the frame arms 9, said brackets being provided upon their lower ends with the cylindrical bosses 23. The inner faces of these bosses are notched or serrated as shown at 24 for engagement by the similarly serrated face 25 upon the edge of the guide member 20. A curved slot 26 extends in concentric relation to this serrated face of the guide member and receives the end of a stud bolt 27 which is fixed in the bosses 23 on the brackets 22 and is threaded to receive the clamping nut 28 whereby the guide member may be clamped in its adjusted position and the slot 21 therein disposed at any desired angle with relation to the longitudinal axis of the machine whereby the throw or extent of adjustment of the truck wheels may be regulated as desired.

The brace bars 10 of the truck frame are connected at a point intermediate of their ends by the transverse channel bar 29 and upon the upper face of this channel bar a segmental gear 30 is rotatably mounted upon the stud 31. This gear is connected upon opposite sides of the supporting stud to the inner ends of the truck axles by means of the link rods 30'. The under surface of the channel bar 7 of the truck frame has formed thereon the forwardly extending bearing sleeve 32 the bore of which coincides with the inclined opening 33 in the plow beam 5. A shaft 34 is disposed through this bearing sleeve and the opening in the beam and at its upper end is journaled in a bearing 35 which is formed upon the support 36 which in turn is integrally formed upon the longitudinal flanges of the channel 7. This support includes the vertically disposed arms 37 upon the upper ends of which the bearings 38 are formed to receive the journals of a worm 39. To one end of this worm a hand wheel 40 is rigidly attached, and said worm meshes with the teeth of a worm gear 41 fixed upon the upper end of the inclined shaft 34. The lower end of this shaft is journaled in a suitable bearing 42 fixed to the channel bar 29 and has secured thereon a pinion 43 to mesh with the teeth of the segmental gear 30.

The operation of the above described mechanism is substantially as follows. When the machine moves upon a hill or other elevation of the grade surface, the operator turns the hand wheel 40 in the proper direction to angularly dispose the truck wheels 18 as shown in dotted lines in Fig. 1. This angular disposition of the wheels is effected through the rotation of the shaft 34 which, through the pinion 43 rotates the segmental gear 30 and moves the links 30' which are connected to the inner ends of the truck axles 16. It will thus be seen that the inner ends of the axles are moved in opposite directions to the slots 21 of the guide members 20 and the outer end of one axle is moved forwardly and upwardly while the outer end of the other axle is moved outwardly and rearwardly, thereby disposing the wheels in parallel angular planes with relation to the longitudinal axis of the machine.

In Figs. 3 to 5 inclusive I have illustrated the manner in which the truck wheels and operating mechanism therefor are mounted when applied to harvesters, potato diggers and similar agricultural machines. In said figures 44 designates the main frame of the machine upon which is mounted a transverse frame 45 on the ends of which the bearings 46 are arranged. In these bearings the ends of the worm shaft 47 are mounted and the worm 39' thereof meshes with the worm wheel 41' upon the lower end of the shaft 34' which is journaled upon the end of the transverse frame 45. The truck wheel axle 16' is journaled for universal movement at its inner end in the bearing 11' which is secured to the vertical channel bar 48 which forms one element of the frame structure 44. The truck wheel 18' is arranged on said shaft outside of the machine frame and the horizontal transversely disposed portion of a channel bar 49 extends over said truck wheel and has its inner end secured to the upper end of the vertical channel bar 48. A brace bar 50 further serves to rigidly support the channel bar 49. The outer end of the bar 49 is vertically disposed and upon its lower end is provided with the curved guide member 20' which is of similar form and construction to that described in connection with the preferred form of the invention. The vertical portion of the channel bar 49 is provided with a lateral extension 51 in the end of which an angularly extending groove or channel 52 is formed. This channel receives the movable rack 53 which is provided upon one end of a rod 54 the other end of which is connected to the outer end of the truck axle 16'. Suitable bearings 55 are formed upon the lateral extension 51 of the bar 49 in which the upper end of the inclined shaft 34' is mounted. Upon this shaft the pinion 43' is fixed to mesh with the teeth of the rack 53 and reciprocate the same in the channel 52. The operation of this form of the invention is practically the same as in the preferred form, the rotation of the worm shaft 47 by means of the hand wheel 40' on the inner end thereof transmitting movement to the rod 54 through the medium of the intermeshing rack and pinion 53 and 43' whereby the truck axle is oscillated in its bearing to position the truck wheel at the desired angle.

From the foregoing it is believed that the construction and operation of my improved vehicle supporting truck will be fully understood. The device is positive in its action and requires but little manual labor for its operation. Owing to the few parts employed in the construction it will further be seen that the mechanism is extremely strong and durable in practical use.

While I have shown and described the preferred construction and arrangement of the various parts, it will be understood that the device is susceptible of a great many minor modifications without departing from the essential feature or sacrificing any of the advantages thereof.

Having thus described the invention what is claimed is:—

1. In a supporting truck for vehicles, an axle fulcrumed for universal movement, a carrying wheel mounted upon said axle, means connected to one end of said axle to move the same in a vertical plane and dispose the wheel at an angle with relation to the longitudinal axis of the vehicle, and means with which said axle co-acts in its vertical movement to effect a positive movement thereof in a longitudinal plane with relation to the vehicle.

2. In a supporting truck for vehicles, an axle fulcrumed intermediate of its ends for universal movement, a carrying wheel mounted on one end of the axle, manually operable means connected to the other end of said axle to move the same in a vertical plane, means with which the latter end of the axle co-acts to positively move the axle in a longitudinal plane with relation to the vehicle during the vertical movement thereof, and means for adjusting said last named means to simultaneously vary the extent of vertical and longitudinal movement of the axle and in inverse relation.

3. A supporting truck for vehicles comprising truck wheels arranged on opposite sides of the vehicle and each having an axle fulcrumed intermediate of its ends for universal bodily movement, in combination with manually operable means for simultaneously moving the truck wheels to angularly position the same with relation to the longitudinal and transverse axes of the vehicle, and means for regulating the extent of such movement.

4. In a supporting truck for vehicles, opposed truck axles mounted for universal movement, carrying wheels mounted upon said axles, a power transmitting shaft, means connecting the adjacent ends of said axle to said shaft to move the axles in opposite vertical directions when the shaft is rotated, a guide member with which each of said axles co-acts in its vertical movement, said guide members positively moving the axles in a longitudinal plane with relation to the vehicle, and means for independently adjusting said guide members to vary the extent of longitudinal movement of one of the axles with relation to the other.

5. A supporting truck for vehicles comprising truck wheels mounted upon opposite sides of the vehicle and each having an inwardly extending axle journaled intermediate of its ends for universal movement, in combination with means connected to the inner ends of the axles to simultaneously move the same in opposite directions whereby the wheels are angularly disposed with relation to the transverse axis of the vehicle, and means with which the inner ends of said axles co-act to effect a longitudinal movement of the same whereby the wheels are also angularly disposed with relation to the longitudinal axis of the vehicle.

6. A supporting truck for vehicles comprising wheels arranged upon opposite sides of the vehicle each having inwardly extending axles fulcrumed intermediate of their ends for universal movement, in combination with manually operable means connected to the inner ends of the axles to simultaneously move the same in opposite directions whereby the truck wheels are angularly disposed with relation to the transverse axis of the vehicle, and adjustable slotted guide members with which the inner ends of said axles co-act to cause a longitudinal movement of the inner ends of the axles in opposite directions whereby the wheels are disposed in different transverse planes and at an angle with relation to the longitudinal axis of the vehicle.

7. A supporting truck for vehicles comprising wheels arranged on opposite sides of the vehicle each having an axle fulcrumed for universal movement, in combination with manually operable means connected to said axles to simultaneously move the same in opposite directions, and means co-acting with said axles to cause their longitudinal movement whereby the truck wheels are disposed in different transverse planes and in parallel angular planes with relation to the longitudinal axis of the vehicle.

8. A supporting truck for vehicles comprising wheels arranged on opposite sides of the vehicle and each having an axle fulcrumed for universal movement, in combination with manually operable means connected to said axles to simultaneously move the same, guide members each having a longitudinal slot through which one of the axles projects, said guide members causing the longitudinal movement of the axles to dispose the wheels carried thereby in different transverse planes, and means for adjusting the guide members to vary the extent of such movement.

9. In a supporting truck for vehicles, an axle journaled for universal movement, a carrying wheel mounted on said axle, manually operable means for moving said axle in a vertical plane, to angularly dispose the wheel with relation to the transverse axis of the vehicle, and a slotted guide member with which said axle co-acts in its vertical movement to positively move the axle in a longitudinal plane with relation to the vehicle and simultaneously dispose the carrying wheel at an angle with relation to the longitudinal axis thereof.

10. In a supporting truck for vehicles, an axle journaled intermediate of its ends for universal movement, a carrying wheel mounted on one end of the axle, manually operable means connected to the other end of the axle to move the same in a vertical plane, a guide member provided with an elongated slot in which the other end of the axle is movably disposed, said axle co-acting with the guide member to move the axle in a longitudinal plane with relation to the vehicle during its vertical movement, and means for adjusting said guide member to vary the disposition of the slot therein with relation to the transverse axis of the axle whereby the extent of longitudinal and vertical movement of the axle is simultaneously and inversely varied.

In testimony whereof I hereunto affix my signature in the presence of two witnesses.

ERNST G. SCHREIBER.

Witnesses:
F. C. CRUMPACKER,
C. B. TINKHAM.

---

Copies of this patent may be obtained for five cents each, by addressing the "Commissioner of Patents, Washington, D. C."